Figures 1, 3:
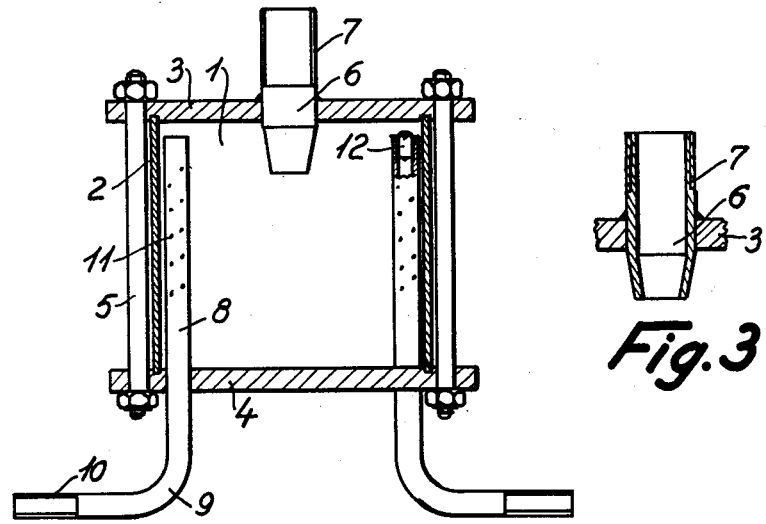

Aug. 4, 1964     K. O. ANDERSEN     3,143,129

DISTRIBUTOR OF LIQUID AMMONIA

Filed Dec. 11, 1962

INVENTOR.
K. O. Andersen
BY
Watson, Cole, Grindle & Watson
ATTORNEYS

United States Patent Office 3,143,129
Patented Aug. 4, 1964

3,143,129
DISTRIBUTOR OF LIQUID AMMONIA
Kaj Otto Andersen, Nyvang pr. Skaelskor, Denmark
Filed Dec. 11, 1962, Ser. No. 243,887
Claims priority, application Denmark Dec. 22, 1961
4 Claims. (Cl. 137—210)

This invention relates to a distributor of liquid ammonia comprising a chamber having an inlet for connection to a source of liquid ammonia and a plurality of outlets for connection to positions of consumption e.g. discharge tubes on harrow teeth for dispersing liquid ammonia into the soil.

Distributors of this kind are known in which the inlet and the outlets are constructed as pipe stubs located exteriorly of the chamber and communicating with the chamber through openings in the chamber wall in front of which baffles or screens of various types may be arranged. In these distributors it has been found very difficult, however, to obtain a uniform distribution of the liquid ammonia as between the various outlets. This is of very great disadvantage when such distributors are used in an apparatus for dispersing ammonia into the soil, because the ammonia will then be non-uniformly distributed in the soil so that stripes are formed in the field which are easily recognizable by the non-uniform size of the plant growth.

The problem therefore exists of obtaining a uniform distribution of ammonia between a relatively great number of outlets. The difficulty of solving this problem arises from the fact that for practical and economical reasons the distributor must necessarily be arranged on the low pressure side of the system where evaporation of the ammonia already takes place to a considerable extent.

The circumstance that the ammonia is present both in the liquid and the gaseous phase is likely to result in a tendency of the liquid phase to collect in certain paths of movement so that some of the outlets from the distributing chamber will receive a relatively great proportion of liquid ammonia while other outlets will predominantly receive gaseous ammonia. The latter outlets will thereby be undersupplied as compared with the former.

It is an object of the invention to remedy this drawback. With this object in view, according to the invention, the outlets are constructed as substantially parallel tubes located in the interior of the chamber, said tubes being closed at one end and being provided with a great number of narrow openings, the mouth of the inlet being directed towards the bottom of the chamber substantially parallel to the tubes.

It has been found that by so constructing the distributor a very even distribution of both liquid and gaseous ammonia between the outlets is obtained. A probable explanation of this result is the following: As a consequence of the narrow openings of the outlet tubes, the liquid ammonia is prevented from flowing directly out through one or more outlets such as may be the case if the outlets communicate with the chamber through one opening only. The narrow openings permit of the passage of liquid ammonia only to a limited extent so that the liquid ammonia must use all the outlet openings available thereto, and at the same time the narrow openings prevent the gaseous ammonia from producing a so strong current in the outlet tubes that the liquid ammonia is prevented from penetrating into these tubes. Moreover, owing to the fact that the mouth of the inlet is directed substantially parallel to the tubes towards the bottom of the chamber, the mixture of gaseous and liquid ammonia entering into the chamber is caused to strike the bottom of the chamber whereby it is to be supposed that the liquid portion of the ammonia predominantly remains at the bottom while the gaseous ammonia collects at the top of the chamber whereby the uniform afflux to the various outlet tubes is additionally favoured. In order to obtain an inflowing jet which is not split up immediately upon entering the chamber, the mouth of the inlet may, according to the invention, preferably be constructed with converging walls whereby the mouth will have a collecting effect on the inflowing jet.

According to the invention, the outlet tubes may extend from the bottom of the chamber towards its top and be devoid of openings in their lower part. This arrangement contributes substantially towards a uniform distribution of the liquid portion of the ammonia since this may only flow through the narrow openings of the outlet tubes after a certain level of liquid ammonia has been built up in the chamber, viz. a level reaching the lowermost ones of the narrow openings. In this connection, the expression "level" should be understood in its broadest sense, it being understood that the ammonia in the chamber is in vivid motion as a consequence of the evaporation that is taking place so that there will be no true liquid level between the liquid and the gaseous phase.

In a preferred embodiment of the invention, the chamber is cylindrical and the outlet tubes are located along the cylindrical wall of the chamber while the inlet tube is located in the cylinder axis. Owing to this arrangement, all the outlet tubes will be located at the same distance from the mouth of the inlet tube, so that the flow resistance is approximately the same for all of the outlet tubes, which additionally promotes the uniformity of the distribution.

However, the distributing chamber may also be differently shaped such as spherical or egg-shaped.

Figure 2:
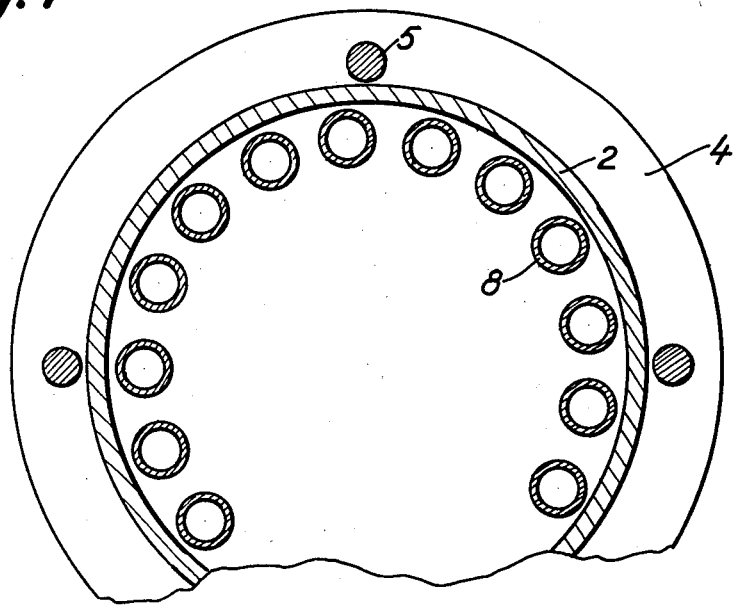

One embodiment of the invention will now be described in further detail with reference to the accompanying drawings, in which FIG. 1 shows a vertical section through the distributor,
FIG. 2 a horizontal section through the same on a larger scale, and
FIG. 3 an axial section through the mouth of an inlet tube of the distributor, likewise on an enlarged scale.

In the drawing, 1 is a cylindrical chamber which is formed by a cylindrical wall 2 closed at its ends by means of two end plates 3 and 4 that are clamped together against the cylindrical wall 2 by means of bolts 5. A tube 6 extends axially through the end wall 3 and is constructed outside the end wall 3 as a threaded pipe stub 7 adapted to be connected to a supply tube or supply hose for liquid ammonia from an ammonia flask through a reduction valve and, if desired, through conventional protecting means.

The mouth of the tube 6 is constructed with converging walls as illustrated in FIG. 3 and extends a small distance into the chamber 1 and is directed towards the bottom thereof.

A plurality of tubes 8 extend axially along the cylinder wall 2 within the cylindrical chamber and extend through the cylinder bottom 4. Outside the latter, in the embodiment shown, the tubes 8 are constructed with bends 9 so as to terminate as horizontal pipe stubs 10 to which e.g. hose connections to discharge tubes on the teeth of an apparatus for dispersing ammonia into the soil may be connected. The tubes 8 terminate adjacent the top wall 3 of the cylinder and are closed at that end by means of plugs 12. Each tube is provided with a great number of uniformly distributed narrow counter sunk holes 11 of a diameter of say 1 mm. The holes 8 begin only at some distance above the bottom 4.

In operation, the ammonia is supplied through the tube 6 and emerges through the mouth thereof so as to be directed towards the cylinder bottom 4. Since the ammonia has passed a reduction valve before flowing into the chamber 1, the inflowing jet is a mixture of liquid and gaseous ammonia. On account of the special condition of the ammonia, a violent movement is produced in the chamber, but it seems probable that the liquid phase has a tendency to collect at the bottom of the chamber and the gaseous phase at the top of the chamber. By virtue of the narrow openings in the outlet tubes, a relatively great resistance is produced against the inflow of the liquid ammonia through the individual openings, so that the liquid ammonia is forced to seek paths towards all the outlets available thereto, i.e. all the lowermost narrow openings in all the tubes. The gaseous phase which, as mentioned, is believed to collect at the top behaves similarly so that approximately the same amounts of liquid and gaseous ammonia flow out through each of the tubes. This uniform distribution is supported by the large area over which the openings of each individual outlet tube are distributed. Since the openings begin only at some distance above the bottom, a certain amount of liquid ammonia has to collect on the bottom before the liquid ammonia begins to flow out to an appreciable extent, and seeing that the liquid phase has a tendency towards establishing a horizontal level, all of the tubes will be immersed in the liquid phase to the same extent. On account of the violent movement to which the ammonia is subjected, it will be understood that no true, well-defined liquid level will be established, but still a tendency towards the distribution of the gaseous and liquid phase referred to.

I claim:

1. A distributor of liquid ammonia comprising a chamber having an inlet for connection to a source of liquid ammonia and a plurality of outlets for connection to positions of consumption, e.g. discharge tubes on harrow teeth for dispersing liquid ammonia into the soil, characterized in that the outlets are constructed as substantially parallel tubes located in the interior of the chamber, said tubes being closed at one end and being provided with a great number of narrow openings in the side walls thereof, the openings of each tube being distributed over a considerable length of the tube starting adjacent to the closed end thereof, the mouth of the inlet being directed towards the bottom of the chamber substantially parallel to the tubes.

2. A distributor as in claim 1 in which the mouth of the inlet is constructed with converging walls.

3. A distributor as in claim 1, characterized in that the outlet tubes extend from the bottom of the chamber towards its top and that the lower parts of the outlet tubes are devoid of openings.

4. A distributor as in claim 1, characterized in that the chamber is cylindrical, and the outlet tubes are located along the cylindrical wall of the chamber while the inlet tube is located in the cylinder axis.

References Cited in the file of this patent

UNITED STATES PATENTS

| 2,168,404 | Grant | Aug. 8, 1939 |
| 2,193,696 | Ramsaur | Mar. 12, 1940 |

FOREIGN PATENTS

| 19,397 | Great Britain | Aug. 30, 1906 |